US007916685B2

(12) United States Patent
Schaedler et al.

(10) Patent No.: US 7,916,685 B2
(45) Date of Patent: *Mar. 29, 2011

(54) METHODS, SYSTEMS, AND COMPUTER PROGRAM PRODUCTS FOR SUPPORTING DATABASE ACCESS IN AN INTERNET PROTOCOL MULTIMEDIA SUBSYSTEM (IMS) NETWORK ENVIRONMENT

(75) Inventors: Richard E. Schaedler, Cary, NC (US); Robert L. Wallace, Apex, NC (US); Aziz A. Tejani, Morrisville, NC (US); Thomas L. Bonds, Jr., Raleigh, NC (US)

(73) Assignee: Tekelec, Morrisville, NC (US)

( * ) Notice: Subject to any disclaimer, the term of this patent is extended or adjusted under 35 U.S.C. 154(b) by 1104 days.

This patent is subject to a terminal disclaimer.

(21) Appl. No.: 11/305,851

(22) Filed: Dec. 16, 2005

(65) Prior Publication Data
US 2006/0161512 A1 Jul. 20, 2006

Related U.S. Application Data

(60) Provisional application No. 60/637,426, filed on Dec. 17, 2004, provisional application No. 60/637,337, filed on Dec. 17, 2004.

(51) Int. Cl.
*H04W 4/00* (2009.01)
(52) U.S. Cl. ............... 370/328; 370/310; 370/310.2; 370/329; 455/422.1; 455/433; 455/434; 455/435.1; 455/435.2; 379/201.01; 379/221.08; 379/229; 379/242
(58) Field of Classification Search .......... 455/410, 455/410.2, 422.1, 433, 434, 435.1, 435.2; 370/310, 310.2, 328; 379/201.01, 221.08, 379/229, 242
See application file for complete search history.

(56) References Cited

U.S. PATENT DOCUMENTS

| 5,535,373 | A | * | 7/1996 | Olnowich | ............... 703/25 |
| 5,765,172 | A | | 6/1998 | Fox | |
| 6,522,641 | B1 | | 2/2003 | Siu et al. | |

(Continued)

FOREIGN PATENT DOCUMENTS
WO WO 2006/066149 A2 6/2006
(Continued)

OTHER PUBLICATIONS

"Operator Guidebook to IMS and New Generation Networks and Services," www.morianagroup.com, First Edition (Aug. 2005).
(Continued)

*Primary Examiner* — Stephen M D'Agosta
(74) *Attorney, Agent, or Firm* — Jenkins, Wilson, Taylor & Hunt, P.A.

(57) ABSTRACT

Methods, systems, and computer program products for supporting database access in an Internet protocol (IP) multimedia subsystem (IMS) network environment are disclosed. At least one call state control function (CSCF) entity generates subscriber-related queries according to an abstracted profile (AP) protocol. At an abstracted profile server (APS), a CSCF-generated, subscriber-related query is received, subscriber information is gathered related to the CSCF-generated, subscriber-related query from at least one subscriber information database using a native protocol of the subscriber information database, a reply message for the CSCF-generated, subscriber-related query is generated based on the gathered subscriber information and the reply message is forwarded to a respective CSCF that generated the CSCF-generated, subscriber-related query, the reply message being forwarded according to the AP protocol.

16 Claims, 10 Drawing Sheets

U.S. PATENT DOCUMENTS

| | | | |
|---|---|---|---|
| 6,785,730 B1* | 8/2004 | Taylor | 709/230 |
| 6,816,469 B1 | 11/2004 | Kung et al. | |
| 6,873,849 B2* | 3/2005 | de la Red et al. | 455/445 |
| 7,027,582 B2 | 4/2006 | Khello et al. | |
| 7,171,460 B2* | 1/2007 | Kalavade et al. | 709/223 |
| 7,254,603 B2* | 8/2007 | Weber et al. | 709/202 |
| 7,380,022 B2* | 5/2008 | Tell et al. | 709/249 |
| 2002/0131395 A1 | 9/2002 | Wang | |
| 2002/0194378 A1 | 12/2002 | Foti | |
| 2002/0196775 A1 | 12/2002 | Tuohino et al. | |
| 2003/0005350 A1 | 1/2003 | Koning et al. | |
| 2003/0040280 A1 | 2/2003 | Koskelainen | |
| 2003/0131151 A1 | 7/2003 | Roach et al. | |
| 2003/0133558 A1 | 7/2003 | Kung et al. | |
| 2003/0149774 A1* | 8/2003 | McConnell et al. | 709/227 |
| 2003/0233461 A1 | 12/2003 | Mariblanca-Nieves et al. | |
| 2004/0103157 A1 | 5/2004 | Requena et al. | |
| 2004/0152469 A1 | 8/2004 | Yla-Outinen et al. | |
| 2004/0203763 A1 | 10/2004 | Tammi | |
| 2004/0205212 A1 | 10/2004 | Huotari et al. | |
| 2004/0223489 A1 | 11/2004 | Rotsten et al. | |
| 2004/0225878 A1* | 11/2004 | Costa-Requena et al. | 713/150 |
| 2004/0234060 A1 | 11/2004 | Tammi et al. | |
| 2004/0246965 A1 | 12/2004 | Westman et al. | |
| 2005/0007984 A1 | 1/2005 | Shaheen et al. | |
| 2005/0009520 A1 | 1/2005 | Herrero et al. | |
| 2005/0058125 A1 | 3/2005 | Mutikainen et al. | |
| 2005/0078642 A1 | 4/2005 | Mayer et al. | |
| 2005/0141511 A1* | 6/2005 | Gopal | 370/395.2 |
| 2005/0155036 A1 | 7/2005 | Tiainen et al. | |
| 2005/0159156 A1* | 7/2005 | Bajko et al. | 455/435.1 |
| 2005/0249196 A1 | 11/2005 | Ansari et al. | |
| 2005/0271055 A1 | 12/2005 | Stupka | |
| 2006/0068816 A1 | 3/2006 | Pelaez et al. | |
| 2006/0090001 A1 | 4/2006 | Collins | |
| 2006/0121913 A1* | 6/2006 | Lin et al. | 455/456.1 |
| 2006/0136557 A1 | 6/2006 | Schaedler et al. | |
| 2006/0211423 A1 | 9/2006 | Ejzak et al. | |
| 2007/0121596 A1 | 5/2007 | Kurapati et al. | |
| 2007/0174400 A1 | 7/2007 | Cai et al. | |
| 2008/0014961 A1 | 1/2008 | Lipps et al. | |
| 2008/0025221 A1 | 1/2008 | Lipps et al. | |
| 2010/0268802 A1 | 10/2010 | Lipps et al. | |

FOREIGN PATENT DOCUMENTS

| | | |
|---|---|---|
| WO | WO 2008/008226 A2 | 1/2008 |
| WO | WO 2008/016607 A2 | 2/2008 |

OTHER PUBLICATIONS

Notification of Transmittal of the International Search Report and the Written Opinion of the International Searching Authority, or the Declaration for PCT/US05/45802 dated Dec. 16, 2005.

Commonly-assigned, co-pending U.S. Patent Application for "Methods, Systems, and Computer Program Products for Clustering and Communicating Between Internet Protocol Multimedia Subsystem (IMS) Entities," (Filed Dec. 16, 2005, Serial No. Not Yet Assigned).

"IP Multimedia Subsystem IMS Over and Applications," 3G Americas, pp. 1-17 (Jul. 2004).

"3$^{rd}$ Generation Partnership Project; Technical Specification Group Core Network; IP Multimedia (IM) Session Handling; IM Call Model; Stage 2 (Release 6)," 3GPP TS 23.218, V6.1.0, pp. 1-56 (Mar. 2004).

"All-IP Core Network Multimedia Domain," 3$^{rd}$ Generation Partnerships Project 2 (3GPP2), 3GPP2 X.S0013-000-0, Version 1.0, pp. i-ii and 1-14 (Dec. 2003).

"3$^{rd}$ Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).

Howard, "SIPPING IETF51: 3GPP Security and Authentication," http:www3.ietf.org/proceedings/01aug/slides/sipping-7, Vodafone, pp. 1-23 (Sep. 13, 2001).

Jalava, "Service Routing in 3GPP IP Multimedia Subsystem," Nokia, pp. 1-16 (Publication Date Unknown).

Supplementary European Search Report for European application No. 05854503.9 (Nov. 17, 2009).

Camarillo et al., "The 3G IP Multimedia Subsystem," John Wiley & Sons, ITD., XP002552956 (Aug. 20, 2004).

"Digital Cellular Telecommunications System (Phase 2+); Universal Mobile Telecommunications System (UMTS); IP Multimedia Subsystem (IMS); Stage 2 (3GPP TS 23.228 version 5.7.0 Release 5)," ETSI, p. 1-130 (Dec. 2002).

Interview Summary for U.S. Appl. No. 11/605,947, (Mar. 23, 2010).

Communication pursuant to Article 94(3) EPC for European Application No. 05854512.0 (Feb. 8, 2010).

Communication pursuant to Article 94(3) EPC for European Application No. 05854503.9 (Feb. 8, 2010).

Final Official Action for U.S. Appl. No. 11/303,757, (Dec. 9, 2009).

Supplementary European Search Report for European Application No. 05854512.0 (Nov. 17, 2009).

Official Action for U.S. Appl. No. 11/605,947, (Oct. 16, 2009).

Interview Summary for U.S. Appl. No. 11/584,247, (Sep. 25, 2009).

Official Action for U.S. Appl. No. 11/584,247, (Sep. 11, 2009).

Interview Summary for U.S. Appl. No. 11/584,247, (Jun. 25, 2009).

Restriction Requirement for U.S. Appl. No. 11/605,947, (Jun. 1, 2009).

Official Action for U.S. Appl. No. 11/303,757, (May 28, 2009).

Official Action for U.S. Appl. No. 11/584,247, (Mar. 13, 2009).

Final Official Action for U.S. Appl. No. 11/303,757, (Oct. 6, 2008).

Official Action for U.S. Appl. No. 11/303,757, (May 7, 2008).

Notification of Transmittal of the International Search Report and the Written Opinion corresponding to International Application No. PCT/US05/45813 (Mar. 24, 2008).

Official Action for U.S. Appl. No. 11/303,757, (Feb. 21, 2008).

Notification of Transmittal of the International Search Report and Written Opinion of the International Searching Authority, or the Declaration corresponding to International Patent Application No. PCT/US07/17116 (Feb. 15, 2008).

Notification of Transmittal of the International Search Report and Written Opinion of the International Searching Authority, or the Declaration corresponding to International Application No. PCT/US07/15290 (Feb. 15, 2008).

Restriction Requirement for U.S. Appl. No. 11/303,757, (Oct. 4, 2007).

Linux-HA Architecture (Release 2), BasicArchitecture: Linux HA, http://www.linux-ha.org/BasicArchitecture, pp. 1-7 (Jun. 8, 2006).

"IP Multimedia Subsystem," Wikipedia, http://en.wikipedia.org/wiki/IP_Multimedia_Subsystem (Downloaded from the Internet on May 22, 2006).

"Operator Guidebook to IMS and New Generation Networks and Services," www.morianagroup.com, Second Edition (Feb. 2006).

Camarillo, "Compressing the Session Initiation Protocol (SIP)," Network Working Group, RFC 3486 (Feb. 2003).

Garcia-Martin et al., "The Session Initiation Protocol (SIP) and Session Description Protocol (SDP) Static Dictionary for Signaling Compression (SigComp)," Network Working Group, RFC 3485 (Feb. 2003).

Arkko et al., Security Mechanism Agreement for the Session Initiation Protocol (SIP), Network Working Group, RFC 3329 (Jan. 2003).

Price et al., "Signaling Compression (SigComp)," Network Working Group, RFC 3320 (Jan. 2003).

Rosenberg et al., "SIP: Session Initiation Protocol," RFC 3261, pp. 1-252 (Jun. 2002).

Narten et al., "Privacy Extensions for Stateless Address Autoconfiguration in IPv6," RFC 3041, pp. 1-16 (Jan. 2001).

Faltstrom, "E.164 Number and DNS," RFC 2916, pp. 1-10 (Sep. 2000).

Vaha-Sipila, "URLs for Telephone Calls," RFC 2806, pp. 1-20 (Apr. 2000).

Aboba et al., "The Network Access Identifier," RFC 2486, pp. 1-8 (Jan. 1999).

Berners-Lee et al., "Uniform Resource Identifiers (URI): Generic Syntax," RFC 2396, pp. 1-38 (Aug. 1998).

Tekelec, "Eagle® Feature Guide," P/N 910-1225-01 (Jan. 1998).

Official Action for U.S. Appl. No. 11/584,247 (Oct. 19, 2010).

Communication pursuant to Article 94(3) EPC for European Application No. 05 854 503.9 (Oct 13, 2010).

Communication pursuant to Article 94(3) EPC for European Applicatin No. 05 854 512.0 (Oct. 12, 2010).
Interview Summary for U.S. Appl. No. 11/605,947 (Sep. 17, 2010).
Official Action for Chinese Patent Application No. 200780033839.3 (Jul. 15, 2010).
Final Official Action for U.S. Appl. No. 11/605,947 (Jul. 8, 2010).
Final Official Action for U.S. Appl. No. 11/584,247 (Apr. 14, 2010).
"Tekelec Announces TekCore IMS Core Platform," (Jun. 5, 2006).
Official Action for U.S. Appl. No. 11/605,947 (Jan. 5, 2011).
Official Action for U.S. Appl. No. 11/303,757 (Dec. 22, 2010).

* cited by examiner

METHODS, SYSTEMS, AND COMPUTER PROGRAM PRODUCTS FOR SUPPORTING DATABASE ACCESS IN AN INTERNET PROTOCOL MULTIMEDIA SUBSYSTEM (IMS) NETWORK ENVIRONMENT

RELATED APPLICATIONS

This application claims the benefit of U.S. Provisional Patent Application Ser. No. 60/637,426 and U.S. Provisional Patent Application Ser. No. 60/637,337 both filed Dec. 17, 2004; the disclosure of each of which is incorporated herein by reference in its entirety.

TECHNICAL FIELD

The subject matter described herein relates to multimedia services and more particularly to supporting database access in an Internet protocol multimedia subsystem network environment.

BACKGROUND

Internet protocol (IP) multimedia subsystem (IMS) is defined by the Third Generation Partnership Project (3GPP) as a new mobile network infrastructure that enables the convergence of data, speech, and mobile network technology over an IP-based infrastructure. IMS bridges the gap between the existing traditional telecommunications technology and Internet technology, allowing network operators to offer a standardized, reusable platform with new, innovative services by enhancing real time, multimedia mobile services, such as voice services, video telephony, messaging, conferencing, and push services. IMS can be used to provide services for both mobile networks and fixed networks at the same time, providing unique mixtures of services with transparency to the end-user.

IMS supports the establishment of any type of media session (e.g., voice, video, text, etc.) and provides the service creator the ability to combine services in the same session and dynamically modify sessions "on the fly" (e.g., adding a video component to an existing voice session). As a result, new and innovative user-to-user and multi-user services become available, such as enhanced voice services, video telephony, chat, push-to-talk, and multimedia conferencing, all of which are based on the concept of a multimedia session. The underlying IMS infrastructure enables mobile IP communication services via its ability to find a user in the network and then to establish a session with the user. The key IMS components enabling mobility management are the call session control function (CSCF) and home subscriber server (HSS). The CSCF is essentially a proxy, which aids in the setup and management of sessions and forwards messages between IMS networks. The HSS holds all of the key subscriber information and enables users (or servers) to find and communicate with other end users.

FIG. 1 is a block diagram illustrating access in an IMS system. In FIG. 1, a visited network 100 includes a proxy CSCF (P-CSCF) 102. The visited network 100 may be part of or in communication with a mobile or fixed network. Accordingly, visited network 100 includes a gateway general packet radio service (GPRS) support node (GGSN) 104, which may in turn communicate with a serving GPRS support node (SGSN) 106 that is in communication with a radio access network (RAN) 108 in which an IMS subscriber is currently located. The subscriber's home network 110 includes an HSS 112 with the subscriber's profile, an interrogating CSCF (I-CSCF) 114, and a serving CSCF (S-CSCF) 116.

IMS uses session initiation protocol (SIP) for multimedia session negotiation and session management. For example, SIP REGISTER and INVITE messages are used in communication with P-CSCF 102, I-CSCF 114, and S-CSCF 116 in FIG. 1. The IMS is essentially a mobile SIP network designed to support this functionality, providing routing, network location, and addressing functionalities. The DIAMETER protocol is used between I-CSCF 114 and HSS 112 and between S-CSCF 116 and HSS 112. DIAMETER provides an authentication, authorization and accounting (AAA) framework for applications such as network access or IP mobility in both local and roaming situations.

P-CSCF 102 is the first contact point within the IMS and behaves like a proxy. The P-CSCF 102 forwards the SIP REGISTER request received from the subscriber's user equipment (UE) (not shown) via GGSN 104, SGSN 106, and RAN 108 to I-CSCF 114, whose identity is determined using the home domain name, as provided by the UE. The SIP messages are forwarded to S-CSCF 116, whose identity P-CSCF 102 received as a result of the registration procedure. P-CSCF 102 also forwards SIP requests or responses to the UE, generates call detail records (CDRs), maintains a security association between itself and each UE, performs SIP message compression and decompression, and authorizes bearer resources and QoS management.

I-CSCF 114 is the contact point within the subscriber's home network 110 for all connections destined to the subscriber or for a roaming subscriber currently located within that network operator's service area. The I-CSCF 114 assigns S-CSCF 116 to a user performing SIP registration, routes a SIP request received from another network towards S-CSCF 116, obtains the address of S-CSCF 116 from HSS 112 and forwards the SIP request or response to the S-CSCF 116.

S-CSCF 116 performs the session control services for the UE and maintains session state as needed by the network operator for support of the services. S-CSCF 116 accepts registration requests, makes its information available through HSS 112, and provides session control. S-CSCF 116 also acts as a proxy server, i.e., it accepts requests and services them internally or forwards them on, and behaves as a User Agent, i.e., it terminates and independently generates SIP transactions. S-CSCF 116 is responsible for interaction with services platforms for the support of services on behalf of an originating endpoint.

HSS 112 holds the subscriber profile and keeps track of the core network node that is currently holding the subscriber. HSS 112 provides mobility management, call and/or session establishment support, and supports the call and/or session establishment procedures in IMS. HSS 112 supports user security information generation, authentication procedures, user identification handling, access authorization, service authorization support service provisioning support, and provides support for application services. HSS 112 may also communicate with an application server (not shown) to offer value added services. The application server and can reside either in the user's home network or in a third party location and enables different services in the IMS network like call-forwarding, call waiting, presence & instant messaging. The application server communicates with the HSS using the DIAMETER protocol.

IMS network operators adopting an IMS infrastructure early stand to gain sizeable competitive advantages. Despite those benefits, it is still desirable to evolve network infrastructure incrementally rather than make radical changes. Accordingly, network operators must provide support for other legacy networks while implementing an IMS infrastructure. A need therefore exists for supporting database access in internet protocol multimedia subsystem network environment while supporting legacy network subscriber database access.

SUMMARY

In one aspect, the subject matter described herein includes a system for supporting database access in an IMS network environment. The system includes at least one CSCF entity for generating subscriber-related queries according to an abstracted profile (AP) protocol. The system also includes an abstracted profile server (APS) for receiving a CSCF-generated subscriber-related query and for gathering subscriber information related to the CSCF-generated subscriber-related query from at least one subscriber information database using a native protocol of the subscriber information database, generating a reply message for the CSCF-generated subscriber-related query based on the gathered subscriber information, and forwarding the reply message to a respective CSCF that generated the CSCF-generated subscriber-related query, the reply message being forwarded according to the AP protocol.

According to another aspect, the subject matter described herein includes an abstracted profile server (APS) for supporting database access in an IMS network environment. The APS is configured for gathering subscriber information from at least one subscriber information database using a native protocol of the subscriber information database, wherein the native protocol is at least one of RADIUS, DIAMETER, MAP, and LDAP, generating a reply message to a subscriber-related query based on the gathered subscriber information, and forwarding the reply message to a source of the subscriber-related query, the reply message being forwarded using a protocol other than the native protocol of the subscriber information database.

According to yet another aspect, the subject matter described herein includes a method is disclosed for supporting database access in an IMS network environment. At least one CSCF entity generates subscriber-related queries according to an abstracted profile (AP) protocol. At an abstracted profile server (APS), a CSCF-generated subscriber-related query is received, subscriber information is gathered related to the CSCF-generated subscriber-related query from at least one subscriber information database using a native protocol of the subscriber information database, a reply message for the CSCF-generated subscriber-related query is generated based on the gathered subscriber information and the reply message is forwarded to a respective CSCF that generated the CSCF-generated subscriber-related query, the reply message being forwarded according to the AP protocol.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

Figure 1:
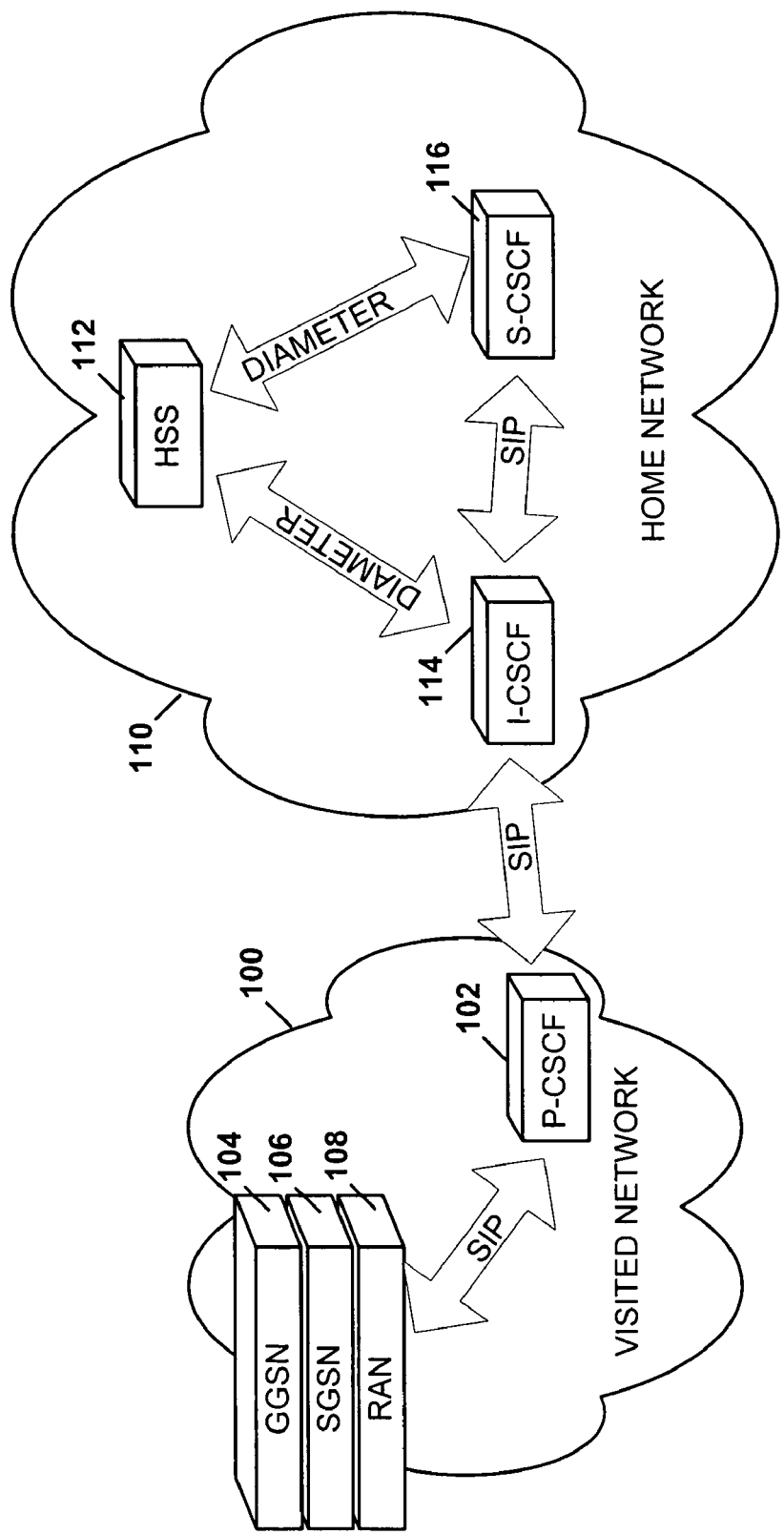
FIG. 1 is a block diagram illustrating access in an IMS system.
Figure 2:
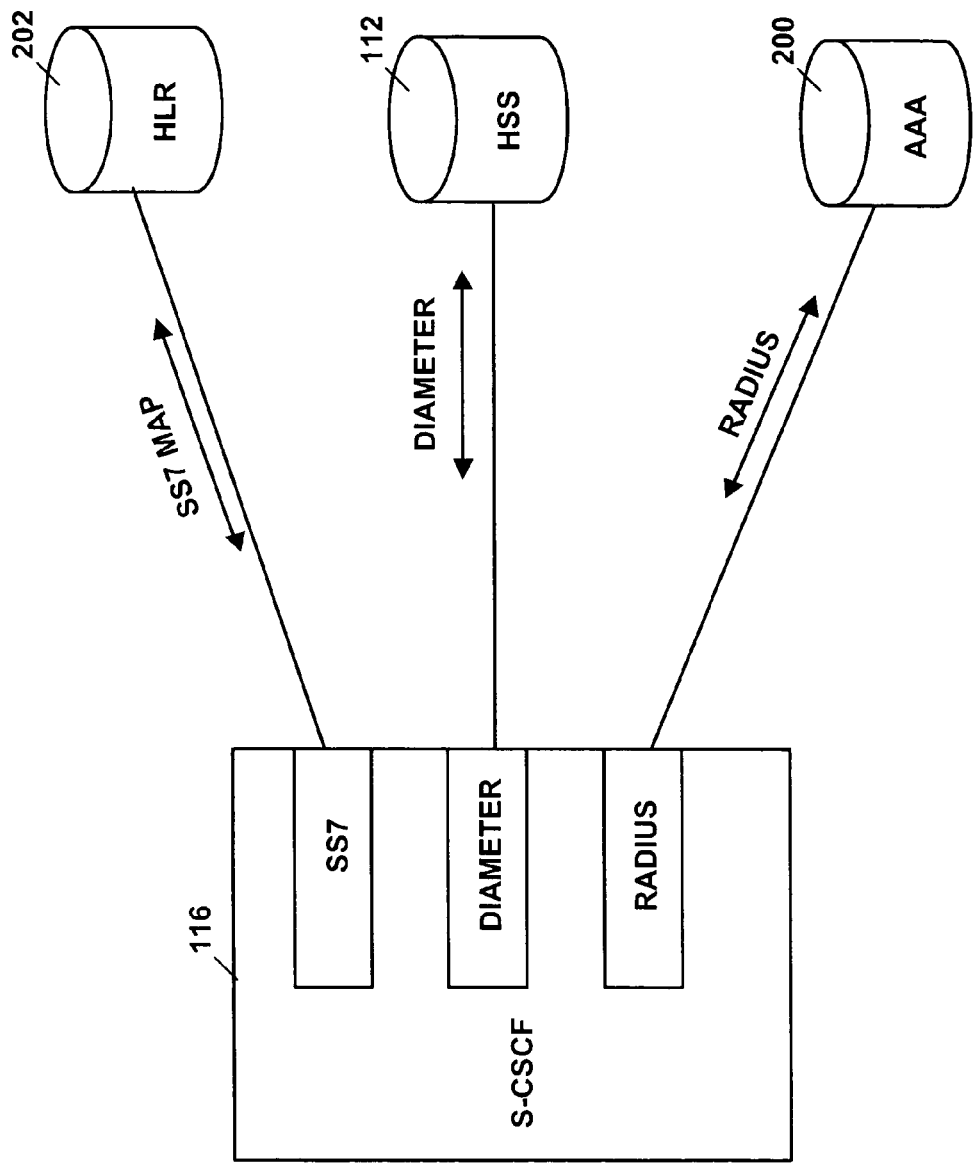
FIG. 2 is a block diagram illustrating an exemplary CSCF in an IMS network environment.

FIG. 2 is a block diagram illustrating an exemplary CSCF in an IMS network environment. In FIG. 2, an S-CSCF 116 communicates with a number of subscriber information databases using a native protocol of each subscriber information database. In the example shown, S-CSCF 116 communicates with a home subscriber server (HSS) 112 using the DIAMETER protocol to obtain a subscriber profile and IM mobility management information associated with an IMS subscriber. S-CSCF 116 may also communicate with an authentication, authorization and accounting (AAA) server 200 using a protocol such as remote access dial-in user service (RADIUS) protocol, and/or with an ENUM database server (not shown) using a DNS protocol. In order to provide support for legacy networks, S-CSCF 116 may also communicate with other subscriber databases, such as a GSM or IS-41 home location register (HLR) 202. Additional databases (not shown) that may be accessed include an equipment identity register (EIR) and/or an authentication center (AuC). S-CSCF 116 communicates with HLR 202, EIR, and AuC using protocols including signaling system 7 (SS7) signaling connection control part (SCCP), signaling user adaptation layer (SUA), transaction capabilities application part (TCAP), lightweight directory access protocol (LDAP), and mobile application part (MAP).

This approach requires the simultaneous support of a multitude of native protocols by S-CSCF 116, which is often impractical from a network operation standpoint due to the complex nature of the required multi-protocol control logic. For example, in certain signaling scenarios it may be necessary to query several network entities (e.g., HSS, HLR, AAA, EIR, AuC, presence server, and the like) in a particular sequence, where the sequence is based, at least in part, on the responses obtained from the various network entities. In a single subscriber-related transaction, AAA 200 may be queried using RADIUS protocol, and, based on the response returned by the AAA server, it may be determined that HSS 112 should be queried using the DIAMETER protocol. Based on the response provided by HSS 112, it may then be determined that HLR 202 should be queried using MAP protocol. This multi-protocol, multi-step approach is believed to consume a significant amount of available resources at S-CSCF 116, which in turn may have a direct impact on the call control processing capabilities of S-CSCF 116.

Figure 3:
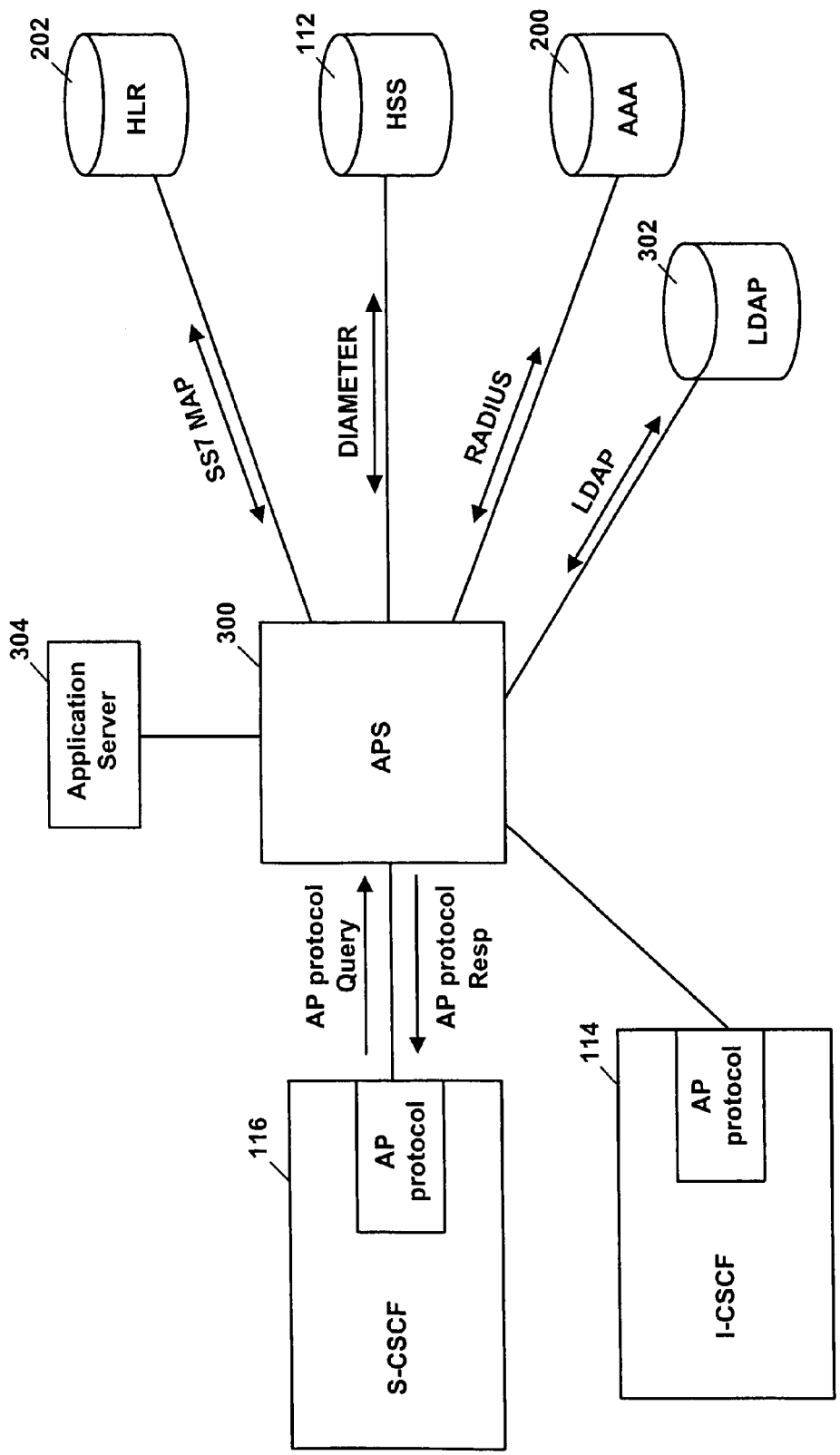
FIG. 3 is a block diagram illustrating a system for supporting database access in an IMS network environment according to an embodiment of the subject matter described herein.

FIG. 3 is a block diagram illustrating a system for supporting database access in an IMS network environment according to an embodiment of the subject matter described herein. In FIG. 3, an abstracted profile server (APS) 300 communicates with S-CSCF 116 using a universal abstracted profile protocol (AP protocol). The AP protocol may be any protocol that supports information requests and corresponding replies to the requests indicating the information requested either directly or indirectly. For example, SIP may be used. APS 300 communicates with any of several subscriber information databases, such as HLR 202, HSS 112, MA 200, and LDAP server 302, using the respective native protocol of the subscriber information database. APS 300 may also communicate with an application server 304 to access and support various applications used by APS 300. Application server 304 may be used as a platform for deploying various services in the IMS network and can provide SIP functionality, 3GPP AS call control, presence information, ENUM service and other services through the use of application programming interfaces (API). An I-CSCF 114 also communicates with APS 300 and is the contact point within the network has described above. S-CSCF 116 includes logic and protocol support for the AP protocol and need not support the several native protocols described above. APS 300 includes logic configured to determine which subscriber information databases should be queried and in what sequence they should be queried. In addition, APS 300 includes logic configured to support each protocol required and to use the appropriate protocol for each query. Accordingly, CSCF protocol support and control logic requirements are greatly simplified.

In operation, when S-CSCF 116 requires subscriber information, a subscriber-related query is generated according to the AP protocol and forwarded to APS 300. APS 300 receives the S-CSCF-generated subscriber-related query and gathers subscriber information related to the CSCF-generated subscriber-related query from at least one subscriber information database, such as HLR 202, HSS 112, AAA 200, and LDAP server 302, using a native protocol of the subscriber information database. APS 300 generates a reply message for the CSCF-generated subscriber-related query based on the gathered subscriber information and forwards the reply message to S-CSCF 116 according to the AP protocol.

Figure 4:
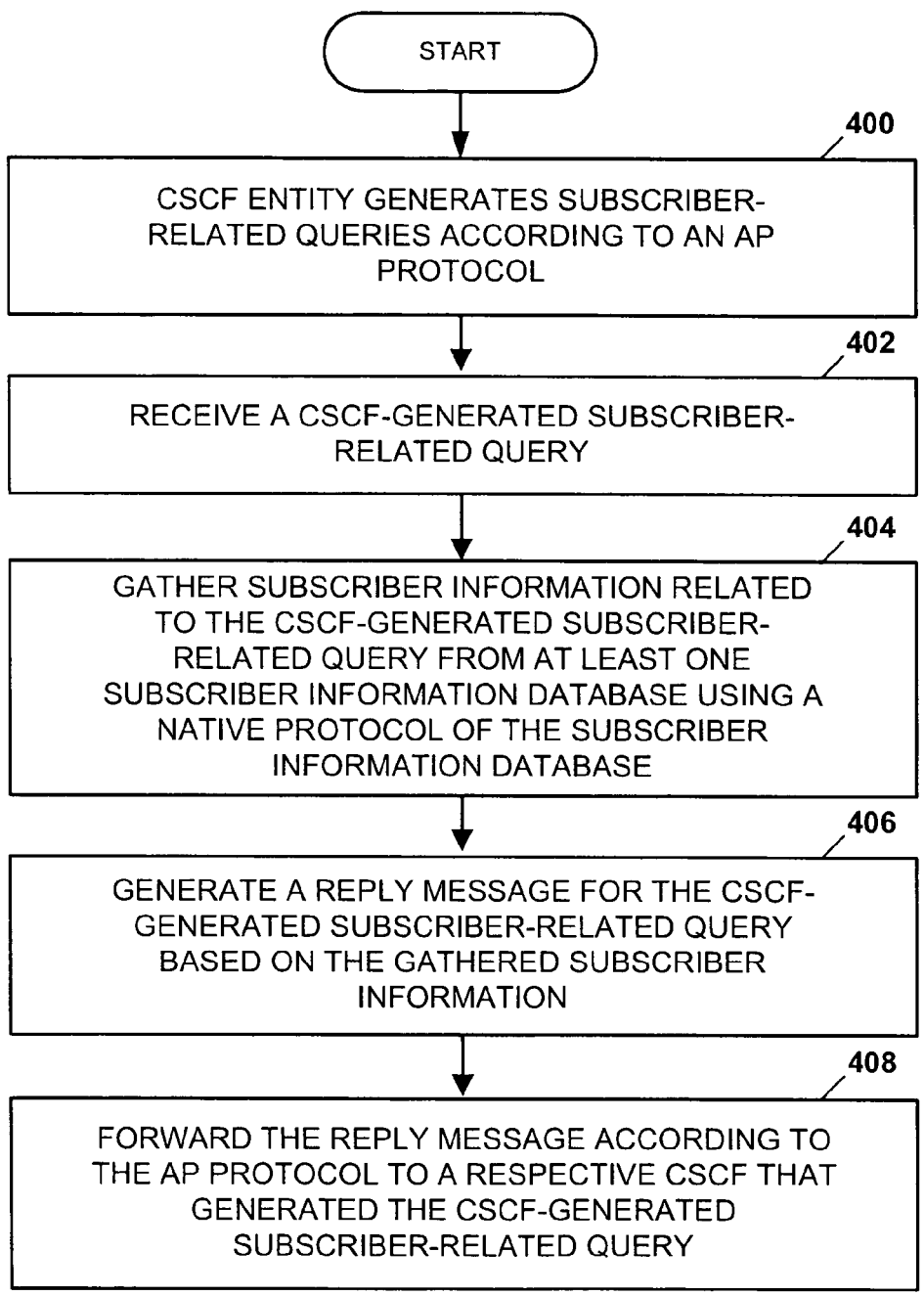
FIG. 4 is a flow chart illustrating a method for supporting database access in and IMS network environment according to an embodiment of the subject matter described herein.

FIG. 4 is a flow chart illustrating a method for supporting database access in an IMS network environment according to an embodiment of the subject matter described herein. In FIG. 4, at least one CSCF entity generates subscriber-related queries according to an (AP) protocol in step 400. APS 300 receives a CSCF-generated, subscriber-related query in step 402 and gathers subscriber information related to the CSCF-generated subscriber-related query from at least one subscriber information database using a native protocol of the subscriber information database in step 404. APS 300 generates a reply message for the CSCF-generated, subscriber-related query based on the gathered subscriber information in step 406 and forwards the reply message according to the AP protocol to a respective CSCF that generated the CSCF-generated subscriber-related query in step 408.

Figure 5:
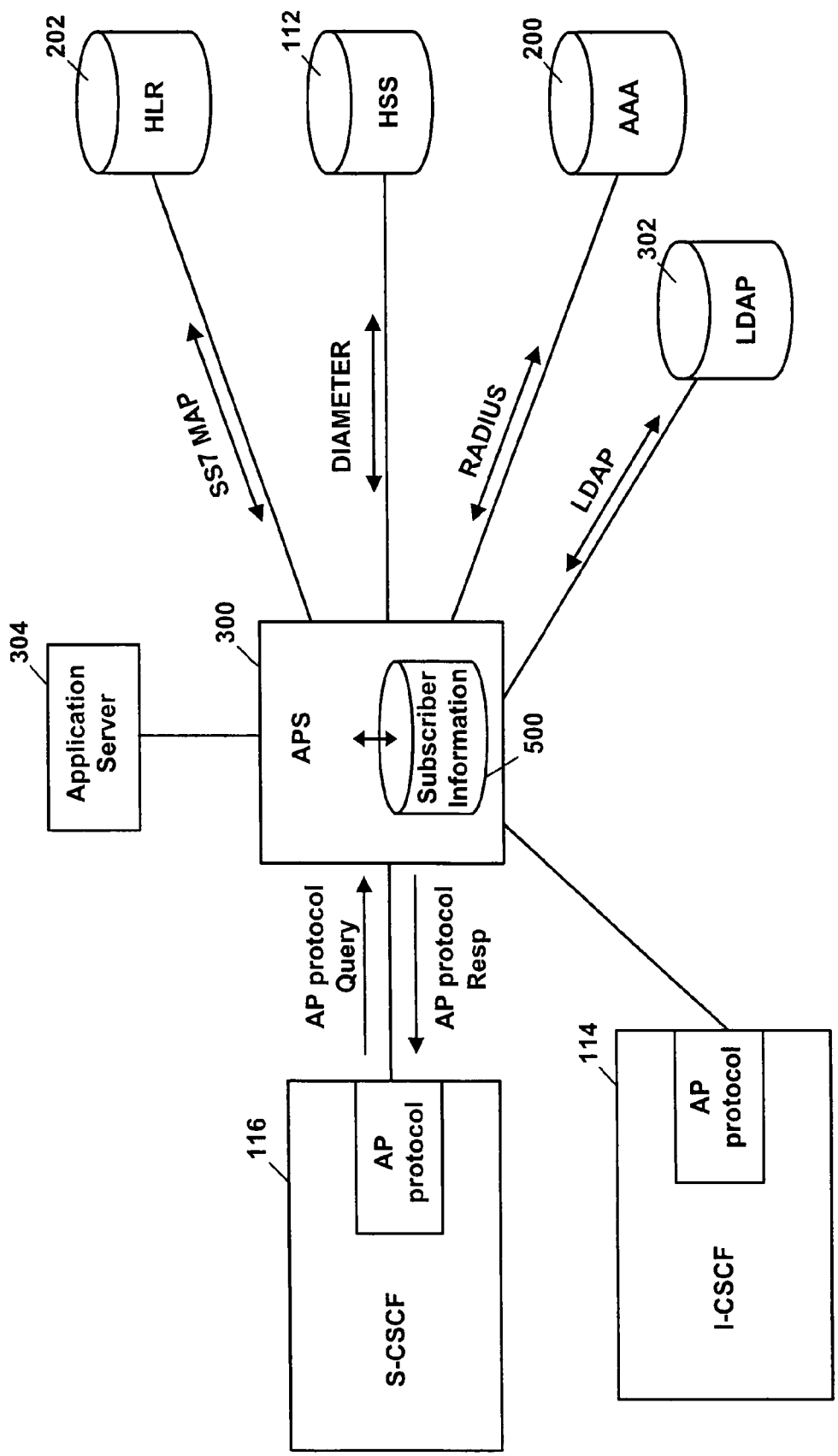
FIG. 5 is a block diagram illustrating a system for supporting database access in an IMS network environment according to another embodiment of the subject matter described herein.

FIG. 5 is a block diagram illustrating a system for supporting database access in an IMS network environment according to another aspect of the subject matter disclosed herein. In FIG. 5, APS 300 includes associated memory 500 or other data storage resources for storing subscriber information received from previous subscriber information database queries. Memory 500 may be an integral part of the APS 300 or may be a separate memory accessible to APS 300. Subscriber information may be stored in memory 500, e.g., cached, for some or all subscribers serviced by APS 300. When APS 300 receives an AP protocol query from S-CSCF 116, some or all of the requested subscriber information can be obtained from memory 500 directly without the need to query the individual subscriber information databases for the information, thus saving time and resources.

Figure 6:
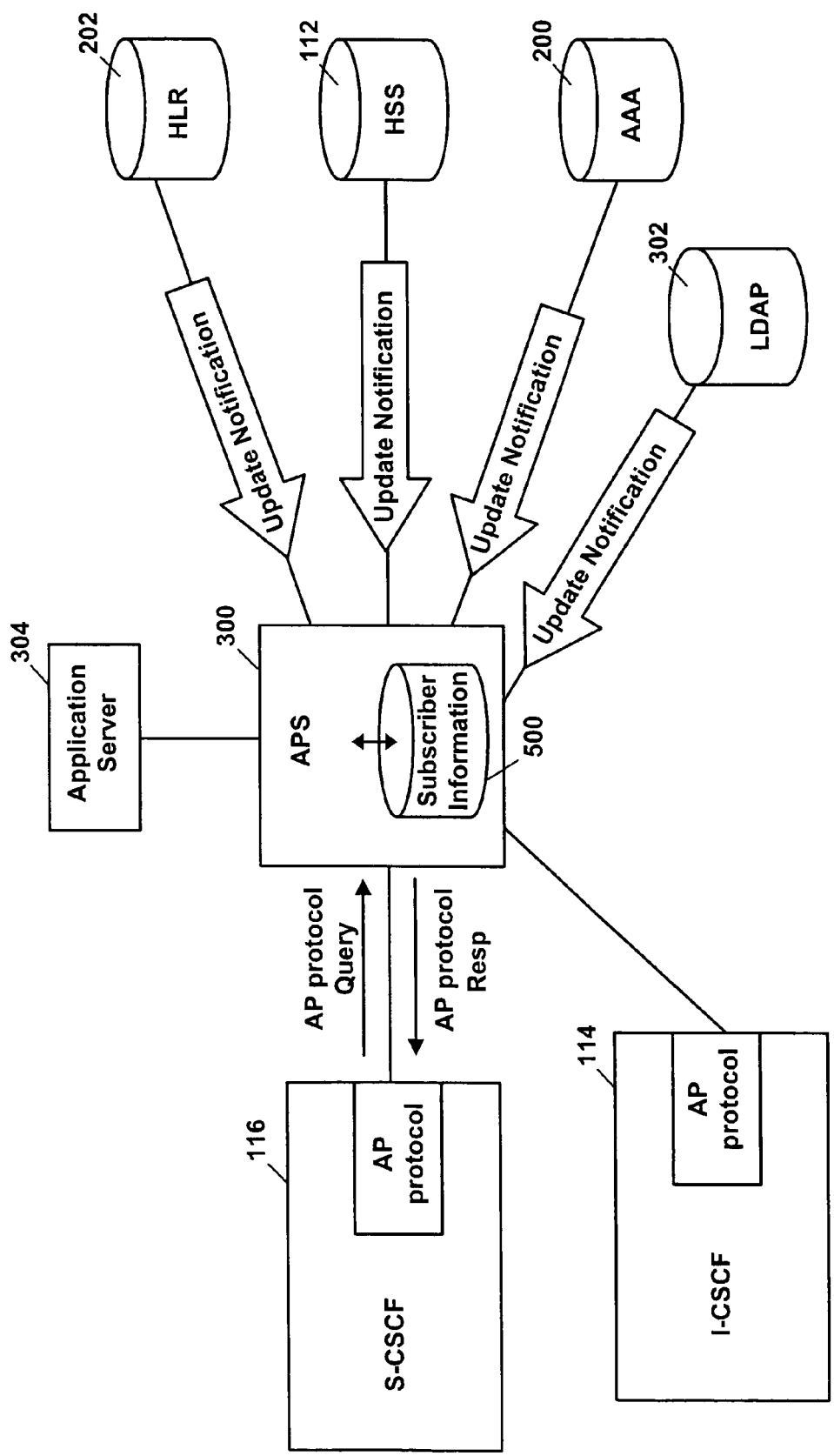
FIG. 6 is a block diagram illustrating a system for supporting database access in an IMS network environment according to another embodiment of the subject matter described herein.

FIG. 6 is a block diagram illustrating a system for supporting database access in an IMS network environment according to another aspect of the subject matter disclosed herein. In FIG. 6, APS 300 gathers subscriber information from the subscriber information databases at least in part by receiving an update notification. For example, as subscriber information is updated in a subscriber information database, such as HLR 202, HSS 112, AAA 200, and LDAP server 302, an update notification is sent from the subscriber information database to APS 300. The update notification may include updated subscriber information from one or more subscriber information databases or may simply inform APS 300 that subscriber information has been updated. In the latter case, APS 300 may then request updated subscriber information from the subscriber information database that sent the update notification. Alternatively, update notifications may be sent to APS 300 at periodic or aperiodic intervals independent of the updating of subscriber information in the subscriber information database. The gathered subscriber information is stored in memory 500.

Figure 7:
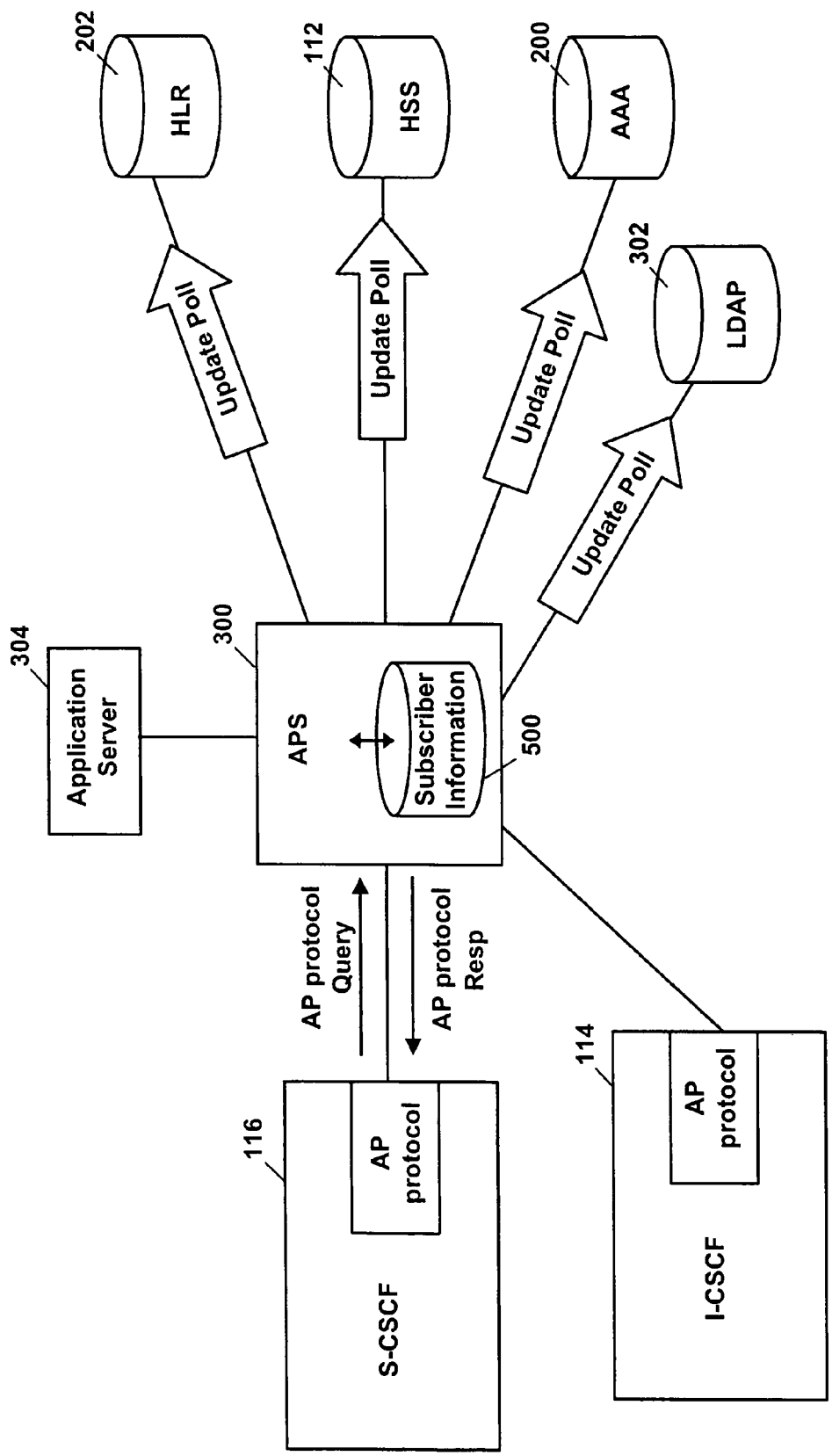
FIG. 7 is a block diagram illustrating a system for supporting database access in an IMS network environment according to another embodiment of the subject matter described herein.

FIG. 7 is a block diagram illustrating a system for supporting database access in an IMS network environment according to another embodiment of the subject matter described herein. In FIG. 7, APS 300 gathers subscriber information from the subscriber information databases at least in part by polling subscriber information databases to determine if updated subscriber information exists. If so, APS 300 requests the updated subscriber information from the respective subscriber information database.

Figure 8:
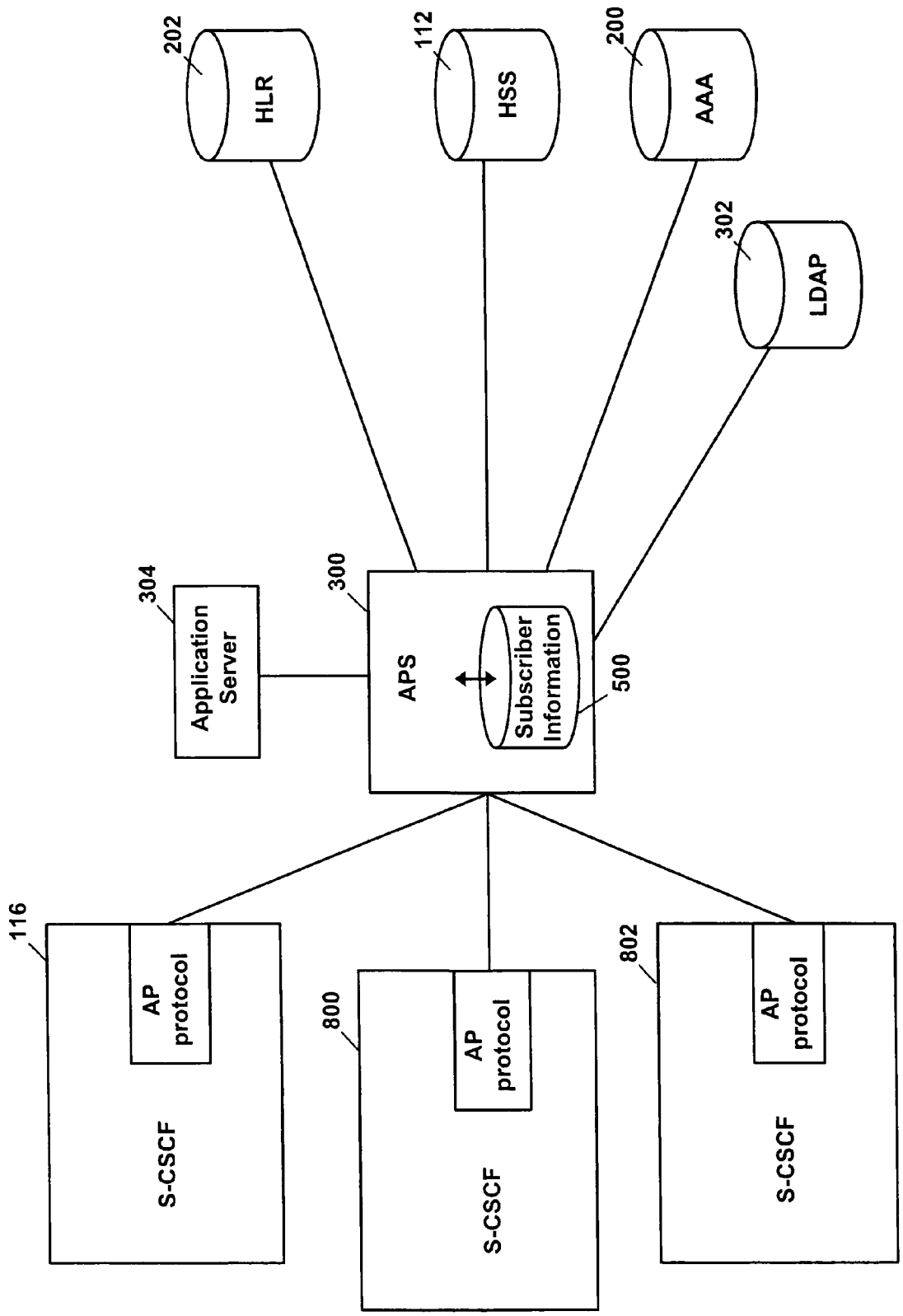
FIG. 8 is a block diagram illustrating a system for supporting database access in an IMS network environment according to another embodiment of the subject matter described herein.

FIG. 8 is a block diagram illustrating a system for supporting database access in an IMS network environment according to another embodiment of the subject matter described herein. In FIG. 8, multiple CSCF entities share a single APS 300. As shown, in addition to S-CSCF 116, S-CSCF 800 and S-CSCF 802 also access the resources of APS 300. Accordingly, APS 300 provides the complex multi-protocol support and control logic functions for multiple S-CSCFs.

Figure 9:
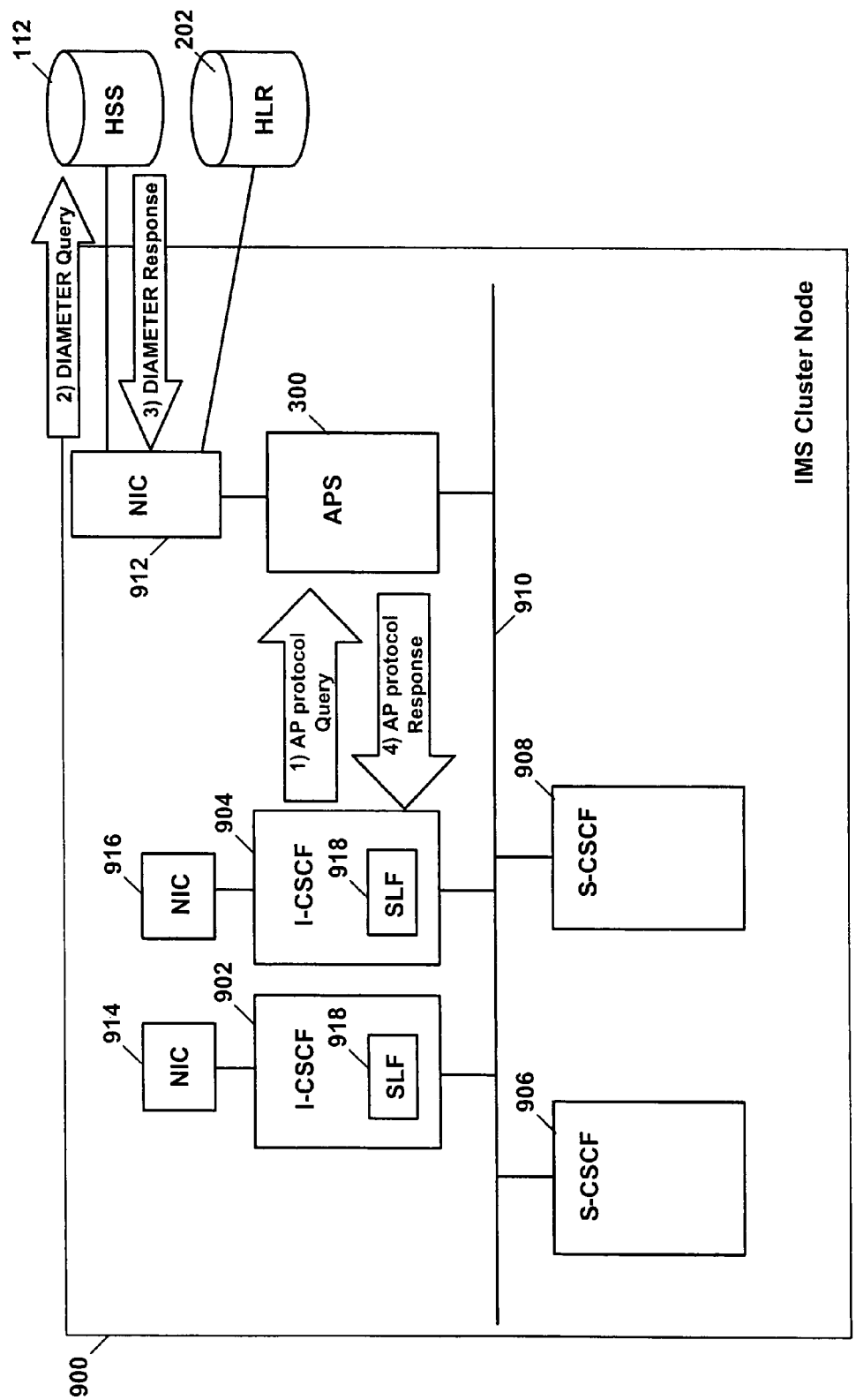
FIG. 9 is a block diagram illustrating an IMS cluster node according to another embodiment of the subject matter described herein.
Figure 10:
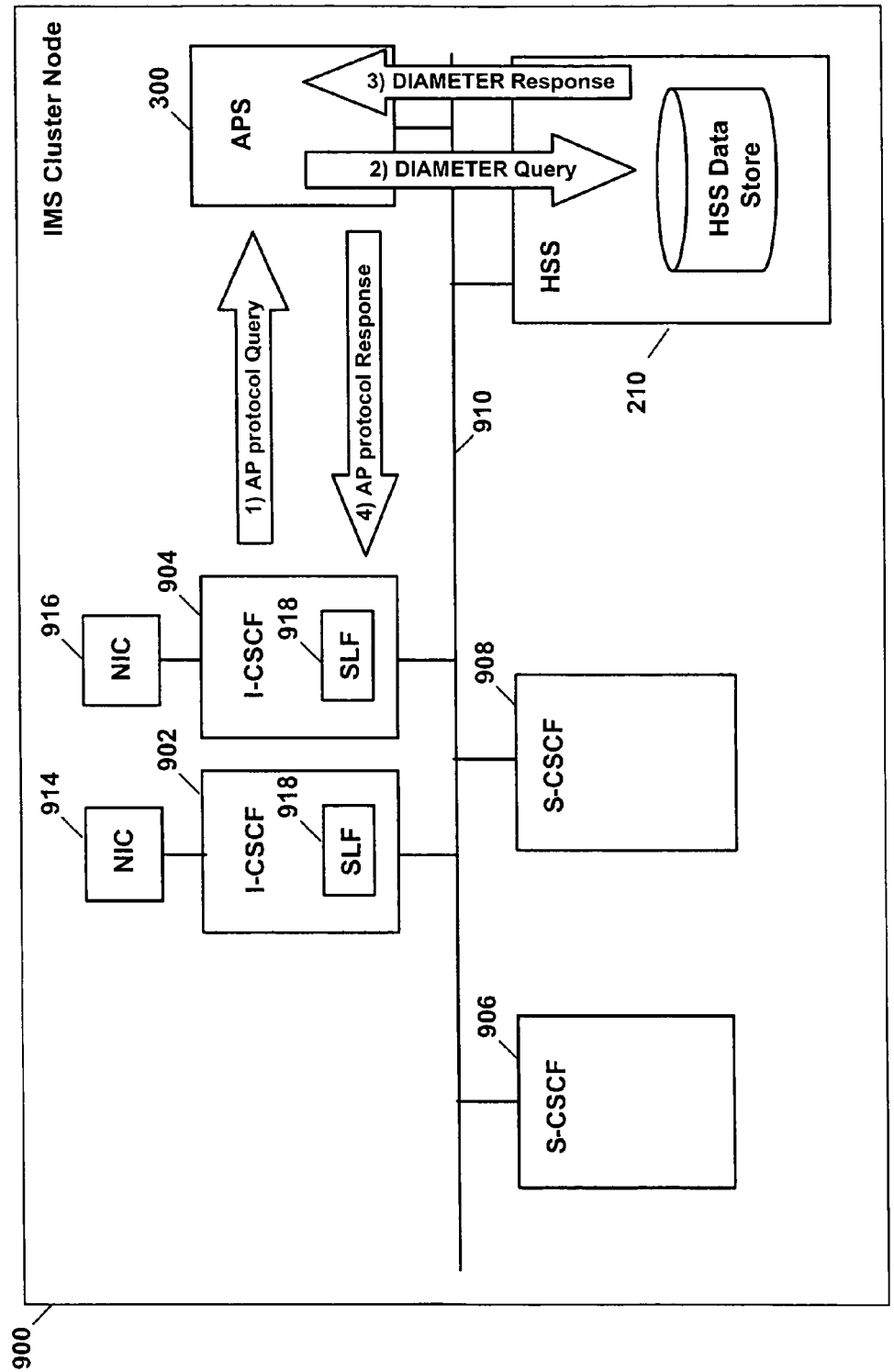
FIG. 10 is a block diagram illustrating an IMS cluster node with HSS functionality included within the IMS cluster node according to another embodiment of the subject matter described herein

FIG. 9 is a block diagram illustrating an IMS cluster node 900 according to another embodiment of the subject matter described herein. IMS cluster nodes are described further in commonly-assigned U.S. Provisional Application No. 60/637,337, filed Dec. 17, 2004, entitled "Methods and Systems for Providing Subscriber Information to a Call State Control Function in an Internet Protocol (IP) Multimedia Subsystem (IMS)," the disclosure of which is incorporated by reference in its entirety. In FIG. 9, IMS cluster node 900 includes I-CSCF modules 902 and 904, S-CSCF modules 906 and 908, an internal communication bus 910, and APS 300 with an associated network interface card (NIC) 912. Internal communication bus 910 provides a communication path between the various printed circuit cards or processor modules in IMS cluster node 900. As such, any module may communicate with other modules in the IMS cluster node 900, such as I-CSCF module 904 and APS 300, via the internal communication bus 910. I-CSCF modules 902 and 904 may also have associated NICs 914 and 916. NICs 912, 914, and 916 are adapted to communicate with circuit switched and/or packet switched networks. I-CSCF modules 902 and/or 904 may include a subscription locator function (SLF) 918. SLF 918 is adapted to receive a communication session-related registration message, such as a session initiation protocol (SIP) REGISTER message, and identify an HSS entity 112 that contains a subscriber's location and subscription information. In the implementation illustrated by FIG. 9, HSS 112 is external to IMS cluster node 900 and accessed by APS 300 via NIC 912. In an alternative implementation illustrated by FIG. 10, HSS 112 functionality is included within IMS cluster node 900 as an HSS processor or module that is connected to internal communication bus 910. Once a subscriber's HSS 112 is identified, the subscriber's HSS 112 processor may be queried to determine the identity of a S-CSCF to which a communication session-related registration message should be forwarded. S-CSCF functionality may be included within IMS cluster node 900 as an S-CSCF processor or module that is connected to the internal communication bus as shown in FIGS. 9 and 10.

For example, I-CSCF 904 may send an AP protocol query to APS 300 via communication bus 910. In the implementation of FIG. 9, APS 300 generates and sends a DIAMETER protocol query to HSS 112 via NIC 912. In the implementation of FIG. 10, APS 300 generates and sends a DIAMETER protocol query to HSS processor 112 via communication bus 910. In either case, a response is received according to the DIAMETER protocol at APS 300. and in the protocol response is generated at APS 300 and forwarded to I-CSCF 904. Although an HSS is used by way of example in FIGS. 9 and 10, it will be appreciated that the above described procedure can be used with any subscriber information database using the appropriate native protocol for the subscriber information database.

As used herein, a subscriber information database may be a network node or a database application residing on a processor within or without an IMS cluster node, or other similar distributed processing system.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A system for supporting database access in Internet protocol (IP) multimedia subsystem (IMS) network environment, the system comprising:
   at least one call state control function (CSCF) entity for generating subscriber-related queries according to an abstracted profile (AP) protocol; and
   an abstracted profile server (APS) configured to obtain subscriber information from each of a plurality of subscriber information databases including a database implemented by an IMS network entity and a database implemented by a legacy network entity, the APS for receiving a CSCF-generated, subscriber-related query and for:
      gathering subscriber information related to the CSCF-generated, subscriber-related query from at least one of the subscriber information databases using a native protocol of the at least one subscriber information database;
      generating a reply message for the CSCF-generated, subscriber-related query based on the gathered subscriber information; and
      forwarding the reply message to a respective CSCF that generated the CSCF-generated, subscriber-related query, the reply message being forwarded according to the AP protocol,
   wherein the APS is adapted to gather subscriber information related to the CSCF-generated, subscriber-related query from the at least one subscriber information database using a native protocol of the subscriber information database by generating, in response to a CSCF-generated, subscriber-related query, at least one corresponding query to the at least one subscriber information database using a native protocol of the at least one subscriber information database and receiving respective replies to the at least one corresponding query.

2. The system of claim 1 wherein the native protocol of the at least one subscriber information database comprises a DIAMETER protocol.

3. The system of claim 1 wherein the native protocol of the at least one subscriber information database comprises a RADIUS protocol.

4. The system of claim 1 wherein the native protocol of the at least one subscriber information database comprises a mobile application part (MAP) protocol.

5. The system of claim 1 wherein the native protocol of the at least one subscriber information database comprises a lightweight directory access protocol (LDAP).

6. The system of claim 1 wherein the at least one CSCF and the APS are part of an IMS cluster node.

7. A system for supporting database access in Internet protocol (IP) multimedia subsystem (IMS) network environment, the system comprising:
   at least one call session control function (CSCF) entity for generating subscriber-related queries according to an abstracted profile (AP) protocol; and
   an abstracted profile server (APS) configured to obtain subscriber information from each of a plurality of subscriber information databases including a database implemented by an IMS network entity and a database implemented by a legacy network entity, the APS for receiving a CSCF-generated, subscriber-related query and for:
      gathering subscriber information related to the CSCF-generated, subscriber-related query from at least one of the subscriber information databases using a native protocol of the at least one subscriber information database;
      generating a reply message for the CSCF-generated, subscriber-related query based on the gathered subscriber information; and
      forwarding the reply message to a respective CSCF that generated the CSCF-generated, subscriber-related query, the reply message being forwarded according to the AP protocol,
   wherein the APS is adapted to gather subscriber information related to the CSCF-generated, subscriber-related query from the at least one subscriber information database using a native protocol of the subscriber information database by receiving the subscriber information from the at least one subscriber information database as the subscriber information is updated and storing the subscriber information at the APS.

8. A system for supporting database access in Internet protocol (IP) multimedia subsystem (IMS) network environment, the system comprising:
   at least one call session control function (CSCF) entity for generating subscriber-related queries according to an abstracted profile (AP) protocol; and
   an abstracted profile server (APS) configured to obtain subscriber information from each of a plurality of subscriber information databases including a database implemented by an IMS network entity and a database implemented by a legacy network entity, the APS for receiving a CSCF-generated, subscriber-related query and for:
      gathering subscriber information related to the CSCF-generated, subscriber-related query from at least one of the subscriber information databases using a native protocol of the at least one subscriber information database;
      generating a reply message for the CSCF-generated, subscriber-related query based on the gathered subscriber information; and
      forwarding the reply message to a respective CSCF that generated the CSCF-generated, subscriber-related query, the reply message being forwarded according to the AP protocol,
   wherein the APS is adapted to gather subscriber information related to the CSCF-generated, subscriber-related query from the at least one subscriber information database using a native protocol of the subscriber information database by polling the at least one subscriber information database for the subscriber information at intervals independent of the receipt of the CSCF-generated subscriber-related query and storing the subscriber information locally to the APS.

9. A method for supporting database access in Internet protocol (IP) multimedia subsystem (IMS) network environment, the method comprising:
   generating, from at least one call state control function (CSCF) entity, subscriber-related queries according to an abstracted profile (AP) protocol; and
   at an abstracted profile server (APS) configured to obtain subscriber information from each of a plurality of subscriber information databases including a database implemented by an IMS network entity and a database implemented by a legacy network entity:
      receiving a CSCF-generated, subscriber-related query;
      gathering subscriber information related to the CSCF-generated, subscriber-related query from at least one of the subscriber information databases using a native protocol of the at least one subscriber information database;
      generating a reply message for the CSCF-generated, subscriber-related query based on the gathered subscriber information; and
      forwarding the reply message to a respective CSCF that generated the CSCF-generated, subscriber-related query, the reply message being forwarded according to the AP protocol,
   wherein gathering subscriber information related to the CSCF-generated, subscriber-related query from the at least one subscriber information database using a native protocol of the subscriber information database by generating, in response to the CSCF-generated, subscriber-related query, at least one corresponding query to the at least one subscriber information database using a native protocol of the at least one subscriber information database and receiving respective replies to the at least one corresponding query.

10. The method of claim 9 wherein the native protocol of the at least one subscriber information database is a DIAMETER protocol.

11. The method of claim 9 wherein the native protocol of the at least one subscriber information database comprises a RADIUS protocol.

12. The method of claim 9 wherein the native protocol of the at least one subscriber information database comprises a mobile application part (MAP) protocol.

13. The method of claim 9 wherein the native protocol of the at least one subscriber information database comprises a lightweight directory access protocol (LDAP).

14. The method of claim 9 wherein the at least one CSCF and the APS are part of an IMS cluster node.

15. A method for supporting database access in Internet protocol (IP) multimedia subsystem (IMS) network environment, the method comprising:
   generating, from at least one call session control function (CSCF) entity, subscriber-related queries according to an abstracted profile (AP) protocol; and
   at an abstracted profile server (APS) configured to obtain subscriber information from each of a plurality of subscriber information databases including a database implemented by an IMS network entity and a database implemented by a legacy network entity:
      receiving a CSCF-generated, subscriber-related query;
      gathering subscriber information related to the CSCF-generated, subscriber-related query from at least one of the subscriber information databases using a native protocol of the at least one subscriber information database;

generating a reply message for the CSCF-generated, subscriber-related query based on the gathered subscriber information; and forwarding the reply message to a respective CSCF that generated the CSCF-generated, subscriber-related query, the reply message being forwarded according to the AP protocol, wherein gathering subscriber information related to the CSCF-generated, subscriber-related query from the at least one subscriber information database using a native protocol of the subscriber information database includes receiving the subscriber information from the at least one subscriber information database as the subscriber information is updated and storing the subscriber information at the APS.

16. A method for supporting database access in Internet protocol (IP) multimedia subsystem (IMS) network environment, the method comprising:

generating, from at least one call session control function (CSCF) entity, subscriber-related queries according to an abstracted profile (AP) protocol; and at an abstracted profile server (APS) configured to obtain subscriber information from each of a plurality of subscriber information databases including a database implemented by an IMS network entity and a database implemented by a legacy network entity:

receiving a CSCF-generated, subscriber-related query;

gathering subscriber information related to the CSCF-generated, subscriber-related query from at least one of the subscriber information databases using a native protocol of the at least one subscriber information database;

generating a reply message for the CSCF-generated, subscriber-related query based on the gathered subscriber information; and forwarding the reply message to a respective CSCF that generated the CSCF-generated, subscriber-related query, the reply message being forwarded according to the AP protocol, wherein gathering subscriber information related to the CSCF-generated, subscriber-related query from the at least one subscriber information database using a native protocol of the subscriber information database includes polling the at least one subscriber information database for the subscriber information at intervals independent of the receipt of the CSCF-generated, subscriber-related query and storing the subscriber information at the APS.

* * * * *